United States Patent [19]

Tanaka

[11] Patent Number: 4,633,299
[45] Date of Patent: Dec. 30, 1986

[54] COLOR TEMPERATURE CONTROL CIRCUIT USING SATURATION LEVEL DETECTOR

[75] Inventor: Yutaka Tanaka, Kanagawa, Japan
[73] Assignee: Sony Corporation, Tokyo, Japan
[21] Appl. No.: 661,717
[22] Filed: Oct. 17, 1984
[30] Foreign Application Priority Data

Oct. 21, 1983 [JP] Japan .................. 58-197242

[51] Int. Cl.$^4$ .......................... H04N 9/64; H04N 9/20
[52] U.S. Cl. ........................................ 358/29; 358/65; 358/28
[58] Field of Search .................. 358/29, 32, 65, 28, 358/40, 27, 64, 21 R, 10

[56] References Cited

U.S. PATENT DOCUMENTS

| | | | |
|---|---|---|---|
| 3,737,561 | 6/1973 | Boer ....................................... | 358/28 |
| 4,127,868 | 11/1978 | Nagaoka et al. ...................... | 358/29 |
| 4,346,399 | 8/1982 | Akutagawa et al. ................. | 358/29 |
| 4,365,265 | 12/1982 | Tsujita et al. ........................ | 358/29 |

OTHER PUBLICATIONS

Liff, *Color and Black and White Television Theory and Servicing*, Prentice-Hall, 2nd edition, 1985, pp. 86–91.
Fink, *Electronic Engineer's Handbook*, McGraw-Hill, 2nd edition, 1982, pp. 20-11–20-13.

*Primary Examiner*—James J. Groody
*Assistant Examiner*—Michael P. Dunnam
*Attorney, Agent, or Firm*—Lewis H. Eslinger; Alvin Sinderbrand

[57] ABSTRACT

A color television receiver is disclosed, which includes a circuit for detecting a color saturation level of a color from red, green and blue primary color signals or from color difference signals and a color temperature control circuit for increasing at least a blue color component on a screen of a color cathode ray tube in accordance with an increase of the color saturation level, the color temperature control circuit being controlled by the output of the color saturation level detecting circuit.

15 Claims, 10 Drawing Figures

COLOR TEMPERATURE CONTROL CIRCUIT USING SATURATION LEVEL DETECTOR

BACKGROUND OF THE INVENTION

1. Field of the Invention

This invention generally relates to color television receivers and, more particularly, to a color temperature control or correction for a color television receiver.

2. Description of the Prior Art

In an NTSC (national television standard committee) system, chromaticity close to the blackbody radiation at a color temperature of 6740° K. is selected to be a standard white color at the image transmitter side. Accordingly, the reference white color upon adjusting the white balance of a color picture tube has to be selected at this color temperature fundamentally.

However, in practice, the white color on the picture screen of the color cathode ray tube which is adjusted as described above is perceived as remarkably "reddish white" under, for example, the illumination of a fluorescent lamp having high color temperature. The reason for this is that human eyes follow illumination light and recognize "bluish white" having high color temperature around the color cathode ray tube as "pure white".

As described above, goodness or badness of the white on the picture screen of the color cathode ray tube greatly depends on the observation condition and also on the preference of each viewer. Generally, it is said that white color having color temperature higher than that of the illumination light is preferred.

While, if the color temperature is set high regardless of the content of a picture image, there arises a problem that a chromatic color, particularly flesh color, becomes bluish and hence unnatural color.

Therefore, in the art it has been proposed to control or correct the color temperature in response to the brightness of a color video signal.

FIG. 1 is a block diagram showing an example of the prior art. In FIG. 1, a composite color video signal is applied to an input terminal 1 and then fed to a Y/C separating circuit 2 where it is separated to a luminance signal Y and a chrominance signal C. The chrominance signal C is color-demodulated by a color demodulating circuit 3 which then produces red, green and blue color difference signals R-Y, G-Y and B-Y, respectively. These color difference signals R-Y, G-Y and B-Y are supplied to a matrix circuit 4. The matrix circuit 4 is also supplied with the luminance signal Y from the Y/C separating circuit 2 through a contrast adjusting variable resistor 5. Thus, the matrix circuit 4 produces red, green and blue primary color signals R, G and B. These red, green and blue primary color signals R, G and B are, respectively, supplied through gain control circuits 6R, 6G and 6B to the cathodes of a cathode ray tube 7. The input vs. output characteristics of the gain control circuits 6R, 6G and 6B are respectively shown in FIGS. 2A, 2B and 2C.

That is, the red primary color signal R is amplified linearly relative to the input. However, although the green primary color signal G and the blue primary color signal B are amplified linearly when the inputs are lower than a predetermined level, when the inputs are higher than the predetermined level, the green primary color signal G and the blue primary color signal B are respectively amplified so as to emphasize green and blue colors. In this case, the blue primary color signal B is emphasized much, while the green primary color signal G may be emphasized a little.

In this case, the above predetermined level is selected to correspond to a portion of high brightness, for example, the telop portion of a white character on a picture screen. The telop portion refers to a character display superimposed upon the television picture on the screen, for example, to display advertising information, announcements, stock market prices and the like.

Thus the telop portion of the white character and the like are made bluish, which is equivalent to the case that the color temperature is raised, white color being reproduced without being reddish. In addition, in the portion of the brightness less than the predetermined level, under the standard color temperature, for example, 9300° K., each primary color signal is supplied to the cathode ray tube so that a flesh color or the like can be prevented from being made bluish.

However, according to such prior art color temperature control or correction system, only the portion of high brightness level such as a portion of a white character and the like can be controlled or corrected and a white color having low brightness level can not be corrected. The reason for this is that this prior art system carries out the color temperature control or correction not for the color saturation level but for the brightness.

Further, since the green and blue primary color signals are passed through the gain control circuits 6G and 6B which are non-linear circuits, there is then a defect that a non-linear characteristic causes color shading.

In addition, there is a further defect that the color temperature is changed by the adjustment of contrast.

OBJECTS AND SUMMARY OF THE INVENTION

Accordingly, it is an object of this invention to provide an improved color television receiver, It is another object of this invention to provide a color television receiver capable of carrying out color temperature control or correction so as to produce a chromatic color as natural color and to produce a beautiful white color on the picture screen of a color cathode ray tube.

It is a further object of this invention to provide a color television receiver having a simplified construction.

According to one aspect of this invention, there is provided a color television receiver comprising:

means for detecting a color saturation level of a color from red, green and blue primary color signals or from color difference signals; and color temperature control means for increasing at least a blue color component on a screen of a color cathode ray tube in accordance with increase of said color saturation level, said color temperature control means being controlled by the output of said color saturation level detecting means.

According to another aspect of this invention, there is provided a color television receiver comprising:

a matrix circuit for producing red, green and blue primary color signals at three output terminals respectively, said matrix circuit being supplied with a luminance signal and three color difference signals;

means for detecting a color saturation level of a color from said red, green and blue primary color signals which are supplied thereto; and means provided on green and blue primary color signal lines for increasing the level of said blue and green primary color signals, said level increasing means being controlled by the output of said color saturation level detecting means.

According to a further aspect of this invention, there is provided a color television receiver comprising:

a matrix circuit for producing red, green and blue primary color signals in negative polarity at three output terminals, respectively, said matrix circuit being supplied with luminance signal and color difference signals;

first, second and third transistors whose bases are connected to said three output terminals, respectively, whose emitters are connected in common to the ground, and whose collectors are connected in common to a power supply source; and subtracting means respectively provided on a blue primary color signal line and a green primary color signal line for subtracting the output of said transistors from said blue primary color signal and green primary color signal, respectively.

According to a yet further aspect of this invention, there is provided a color television receiver comprising:

a color demodulator supplied with a chroma signal and for producing three color difference signals;

a matrix circuit for producing red, green and blue primary color signals in negative polarity at three output terminals, respectively, said matrix circuit being supplied with a luminance signal and said three color difference signals from said color demodulator;

first, second and third transistors whose bases are supplied with said three color difference signals, respectively, whose emitters are connected in common to the ground, and whose collectors are connected in common to a power supply source; and subtracting means respectively provided on a blue primary color signal line and a green primary color signal line for subtracting the output of said transistors from said blue and green primary color signals, respectively.

The other objects, features and advantages of the present invention will become apparent from the following description taken in conjunction with the accompanying drawings through which the like references designate the same elements and parts.

DESCRIPTION OF THE PREFERRED EMBODIMENTS

Now, the present invention will hereinafter be described in detail with reference to the drawings.

Figure 1:
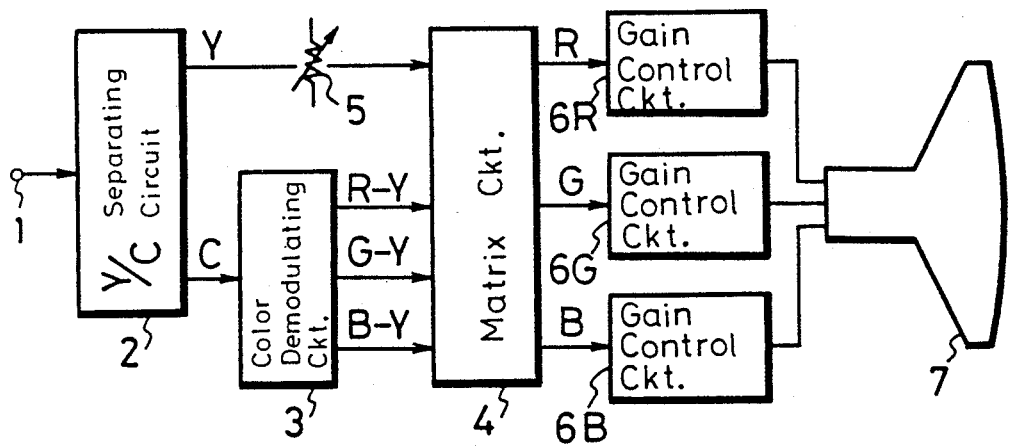
FIG. 1 is a block diagram showing an example of a prior art color television receiver.
Figure 2A:
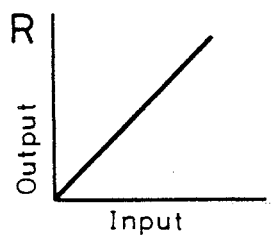
FIGS. 2A to 2C are respectively graphs of input vs. output characteristics useful for explaining the prior art color television receiver shown in FIG. 1.
Figure 2B:
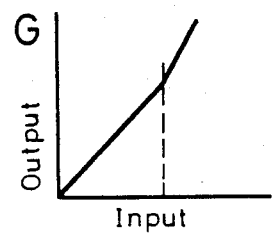
Figure 2C:
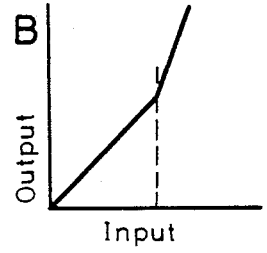
Figure 3:
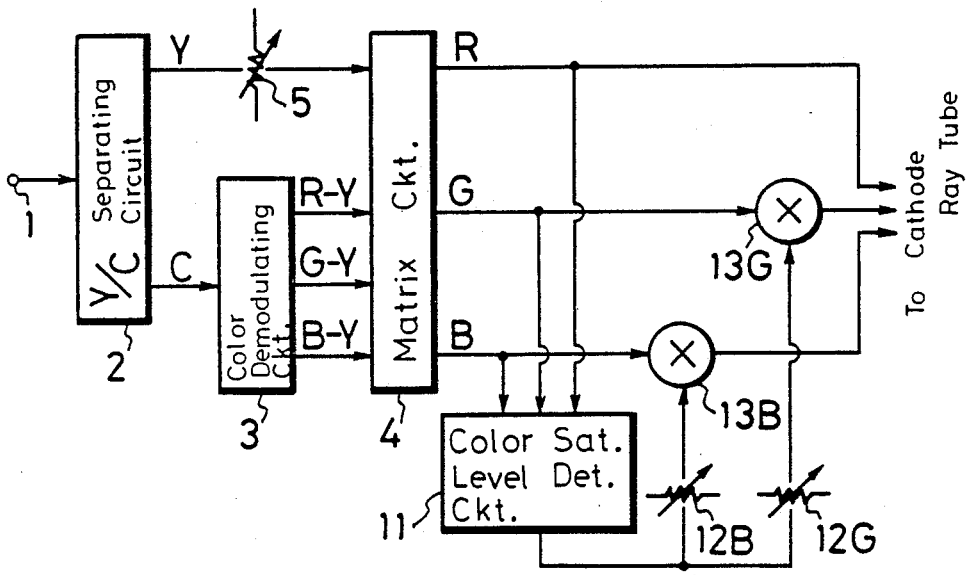
FIG. 3 is a block diagram showing a principle circuit arrangement of an embodiment of a color television receiver according to this invention.

FIG. 3 is a block diagram showing a principle embodiment of a color television receiver according to this invention. In FIG. 3, like parts corresponding to those in FIG. 1 are marked with the same references and will not be described in detail.

First, the principle of this invention will be described and this principle is based on the following consideration.

Figure 4:
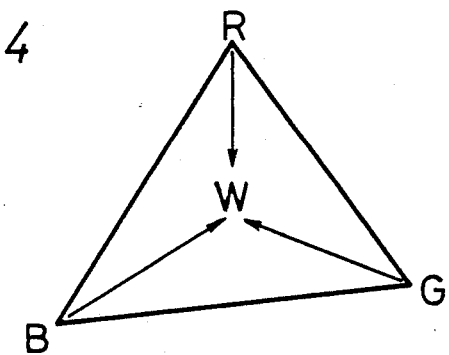
FIG. 4 is a diagram useful for the explanation thereof.

That is, on the chromaticity diagram as shown in FIG. 4, the color temperature control or correction is inherently carried out such that the control or correction is not performed for each primary color but the controlling or correcting amount thereof must be increased as approaching the white W (namely, in accordance with the arrow directions in FIG. 4). The most accurate method for obtaining such control or correction signal is to detect a color saturation level. The color temperature can be controlled or corrected by the signal thus detected. Because, the color saturation level indicates a ratio in which each color is lightened by white color.

This invention is based on the above consideration and so, in the embodiment as shown in FIG. 3, red, green and blue primary color signals R, G and B delivered from the matrix circuit 4 are all supplied to a color saturation level detecting circuit 11 which detects the color saturation level of each color signal. The detected output is supplied through level adjusting circuits 12G and 12B to multiplying ciccuits 13G and 13B. The multiplying circuit 13G is also supplied with the green primary color signal G and the multiplying circuit 13B is also supplied with the blue primary color signal B. Then, such a control or correction is carried out that in response to the color saturation level, or as the color saturation level becomes high, the levels of the green and blue primary color signals G and B become high. In this case, the red primary color signal R is not corrected or controlled. Further, the correction or control amounts are adjusted by the level adjusting circuits 12G and 12B such that the control or correction amount of the green primary color signal G is made smaller than that of the blue primary color signal B. In addition, it may be possible that the green primary color signal G is not corrected but only the blue primary color signal B is corrected.

Thus, since the blue and green color signal components are corrected to become large as the color saturation levels thereof become high, the correction is performed such that the color temperature is just made high. As a result, white color is beautifully reproduced on the picture screen of the color cathode ray tube. While the color saturation level is low and the nearer the color approaches the primary color, the lower the correcting amount becomes so that the color temperature becomes close to the ordinary standard color temperature (for example, 9300° K.), thus a chromatic portion never being made bluish but being presented with a natural color.

By the way, if a circuit capable of accurately detecting the color saturation level is used as the color saturation level detecting circuit 11, the circuit arrangement becomes very complicated. Therefore, a description will be given on an example in which the color saturation level can be easily detected and the color temperature can be controlled or corrected simply.

The principle of this example will be described first.

Figure 5:
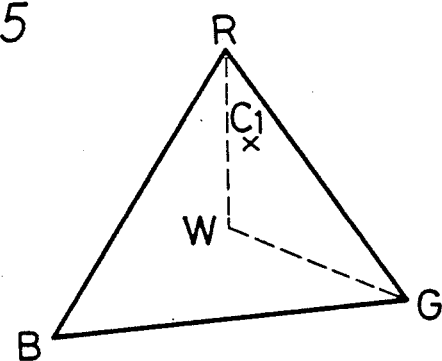
FIGS. 5 and 6 are respectively diagrams useful for explaining an example of a main part of this invention.

As is clear from the chromaticity diagram as shown in FIG. 5, all colors can be presented by three primary colors or red, green and blue colors. In other words, every color within the triangular region encircled by red, green and blue colors on the chromaticity diagram can be represented by the three primary colors. Accordingly, on the basis of similar consideration, a desired color can be represented by white color component W and two primary colors of three primary colors of red, green and blue. By way of example, a certain color $C_1$ on the chromaticity diagram of FIG. 5 can be presented by the white color component W and red and green primary colors R and G. In this case, the white color component W is the amount of white color contained in a certain color, namely, the amount corresponding to the color saturation level thereof.

While the principle of this example is described with reference to the chromaticity diagram of FIG. 5 as above, this principle will also be described with reference to voltage amplitudes $E_R$, $E_G$ and $E_B$ of the respective primary color signals as follows.

Figure 6:
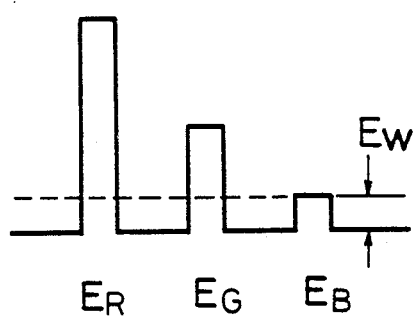

That is, a desired color can be presented by three primary color signal voltages $E_R$, $E_G$ and $E_B$ as shown in FIG. 6. Here, let us consider the minimum value of three voltage amplitudes $E_R$, $E_G$ and $E_B$, namely, $E_W = \text{Min}(E_R, E_G, E_B)$. This minimum value is considered to be the voltage amplitude corresponding to the white color component of the desired color and the desired color can be presented by three of amplitudes $E_W$, $E_1 = E_R$ and $E_2 = E_G$.

As described above, this voltage amplitude $E_W$ indicates the color saturation level so that the color saturation level can be detected by detecting the voltage amplitude $E_W$.

Figure 7:
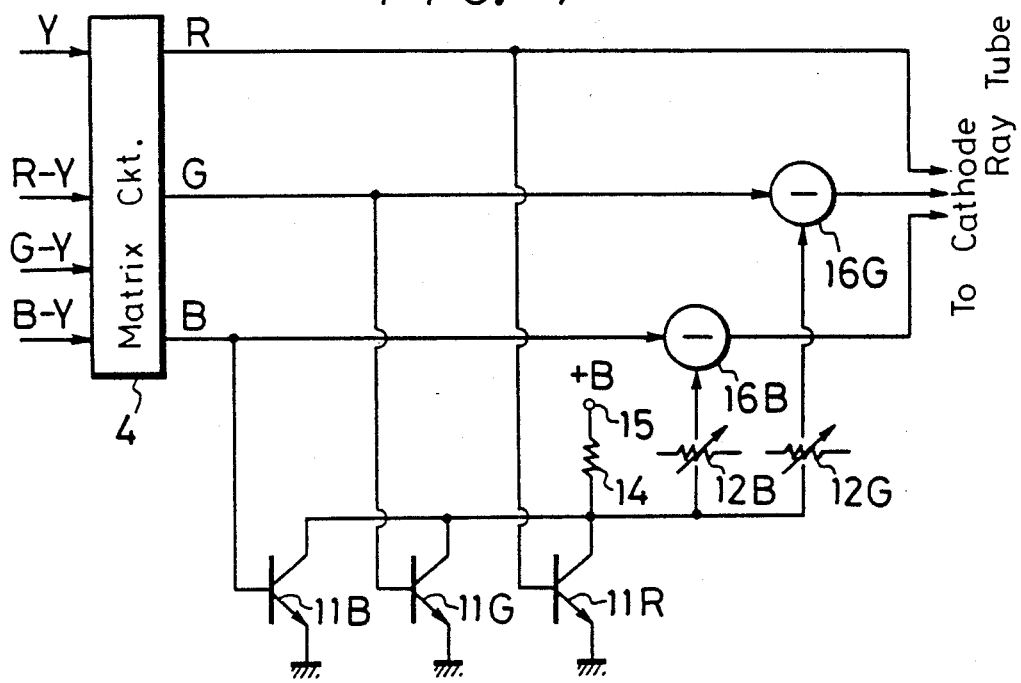
FIG. 7 is a block diagram of another embodiment of the color television receiver according to this invention.

FIG. 7 shows an embodiment of the color television receiver according to this invention which takes the above principle into consideration.

In this embodiment, each primary color signal derived from the matrix circuit 4 has the negative polarity.

In this embodiment, as the color saturation level detecting circuit 11, there are provided three transistors 11R, 11G and 11B. The collectors of these transistors 11R, 11G and 11B are connected common and the emitters thereof are respectively grounded. The commonly connected collectors of the transistors 11R, 11G and 11B are connected through a resistor 14 to a power source terminal 15. Then, the red, green and blue primary color signals R, G and B from the matrix circuit 4 are respectively supplied to the bases of the transistors 11R, 11G and 11B and the output is derived from the common connection point of the collectors of these transistors 11R, 11G and 11B. The output therefrom is supplied through the level adjusting circuits 12G and 12B to a subtracting circuit 16G for the green primary color signal G and a subtracting circuit 16B for the blue primary color signal B, respectively.

In this case, while appropriate control or correction amounts are determined by the level adjusting circuits 12G and 12B, the correction amount for the green primary color signal may be very small unlike that for the blue primary color signal.

As mentioned before, since the signals derived from the matrix circuit 4 are the voltage signals of negative polarity (the white level has lower voltage), the base voltage of the transistor to which the minimum amplitude (the amplitude $E_W$) of the amplitudes $E_R$, $E_G$ and $E_B$ is supplied becomes highest and the output produced at the common connection point among the collectors of the transistors 11R, 11G and 11B is substantially dominated by the collector voltage of the transistor to which this voltage amplitude $E_W$ is supplied. Then, this output voltage becomes low when the voltage amplitude $E_W$ is small, while this output voltage becomes high when the voltage amplitude $E_W$ becomes large. Since this output voltage is supplied through the level adjusting circuits 12G and 12B to the subtracting circuits 16G and 16B, the control or correction voltage corresponding to the magnitude of the voltage amplitude $E_W$ is added to the green and blue primary color signals G and B with negative polarity, namely, so as to make the amplitudes thereof larger in the subtracting circuits 16G and 16B. In other words, when the amplitudes $E_W$ of the white color component contained in the chrominance signal C, or the color saturation level thereof is low (near the primary color), the correction voltages added in the subtracting circuits 16G and 16B with negative polarity are low, while when the amplitude $E_W$ becomes large and hence the color saturation level becomes higher (near the white color), the correction voltage to be added becomes high. That is, the higher the color saturation level becomes, the more the blue and green color components are increased. As a result, such correction is performed that the color temperature is increased.

Figure 8:
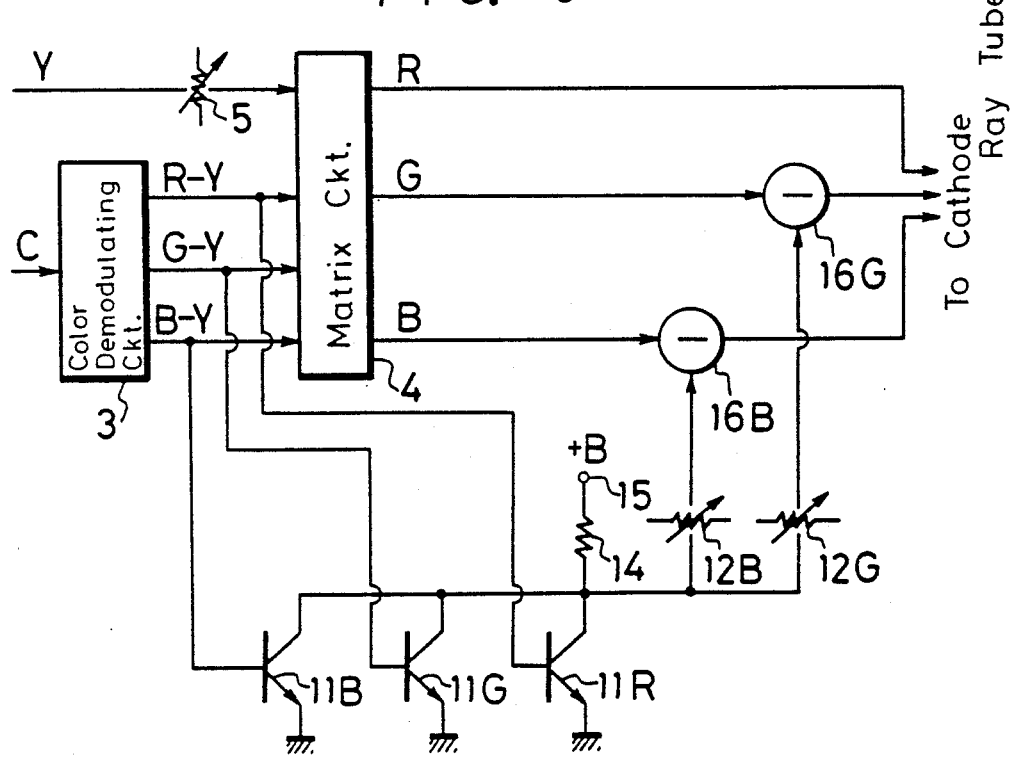
FIG. 8 is a block diagram of a further embodiment of the color television receiver according to this invention.

In order to detect the color saturation level, the color difference signals R-Y, G-Y and B-Y may be used as shown in FIG. 8.

That is, this reason is as follows:

$$\text{Min}(E_R, E_G, E_B)$$
$$= \text{Min}(E_{R-Y}+E_Y, E_{G-Y}+E_Y, E_{B-Y}+E_Y)$$
$$= \text{Min}(E_{R-Y}, E_{G-Y}, E_{B-Y}) + E_Y$$

is established and calculating the minimum value of the primary color signal amplitude $E_R$, $E_G$ and $E_B$ is equivalent to calculating the minimum value of the color difference signal amplitudes $E_{R-Y}$, $E_{G-Y}$ and $E_{B-Y}$. In this case, since the luminance component $E_Y$ is not contributable to the color saturation level, it is not necessary to take the luminance component $E_Y$ into consideration.

In the above embodiments, it is possible that the green primary color signal is not corrected but only the blue primary color signal is corrected.

According to this invention, since the color temperature correction or control is carried out in accordance with the color saturation level, the white color can be presented more beautifully and the chromatic colors are not made bluish and reproduced as natural color on the picture screen of the color cathode ray tube.

Especially when the method for detecting the minimum value of the primary color signal amplitudes or the color difference signal amplitudes is used as the method for detecting the color saturation level, the circuit arrangement can be made very simple.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention:

1. A color television receiver comprising:
   a color cathode ray tube having a screen;
   color saturation level detecting means for detecting a color saturation level of a color signal selected from a group of three color signals and producing an output in accordance with the detected color saturation level; and
   color temperature control means responsive to said output for increasing at least a blue color component of an image displayed on said screen of said color cathode ray tube in accordance with an increase of the detected color saturation level.

2. A color television receiver according to claim 1, in which said color signals are in negative polarity and said color saturation level detecting means detects the minimum amplitude level of said group of color signals as said color saturation level.

3. A color television receiver according to claim 2, in which said blue color component is derived from a blue primary color signal supplied to said color cathode ray tube along a blue primary color signal line and in which said color temperature control means includes level control means provided at least on said blue primary color signal line for increasing at least the amplitude level of said blue primary color signal.

4. A color television receiver according to claim 3, in which said level control means increases at least the amplitude level of the blue primary color signal in accordance with a decrease of said amplitude level detected by said color saturation level detecting means.

5. A color television receiver according to claim 4, in which said level control means includes multiplier circuit means.

6. A color television receiver according to claim 4, in which said level control means includes subtracting circuit means.

7. A color television receiver according to claim 4, in which a green primary color signal is provided to said color cathode ray tube along a green primary color signal line and in which said level control means is additionally provided on said green primary color signal line.

8. A color television receiver according to claim 7, in which said color saturation level detecting means includes three transistors whose bases are supplied with respective ones of said color signals, whose emitters are connected in common to ground, and whose collectors are connected in common at a connection point, said output of said color saturation level detecting means being obtained from said connection point of said collectors.

9. A color television receiver according to claim 1, wherein said group of three color signals is a selected one of the group of red, green and blue primary color signals and the group of three color difference signals.

10. A color television receiver comprising:
    matrix circuit means for producing red, green and blue primary color signals at respective output terminals along red, green and blue primary color signal lines, respectively, said matrix circuit means being supplied with a luminance signal and three color difference signals;
    color saturation level detecting means receiving said red, green and blue primary color signals for detecting a color saturation level of a selected one of said color signals and producing an output in accordance with the detected color saturation level; and
    level increasing means provided on said green and blue primary color signal lines for increasing the level of said blue and green primary color signals, said level increasing means being controlled by the output of said color saturation level detecting means.

11. A color television receiver according to claim 10, in which said level increasing means includes level control means for controlling the level of said output of said color saturation level detecting means and first and second multiplying circuit means respectively provided on said blue and green primary color signal lines, said first multiplying circuit means being responsive to the output of said level control means and to said blue primary color signal, and second multiplying means being responsive to said output and to said green primary color signal.

12. A color television receiver comprising:
    matrix circuit means for producing red, green and blue primary color signals in negative polarity at respective output terminals along red, green and blue primary color signal lines, respectively, said matrix circuit means being supplied with a luminance signal and three color difference signals;
    first, second and third transistors whose bases are connected to respective ones of said three output terminals, whose emitters are connected in common to ground, and whose collectors are connected in common to a connection point connected in turn to a power supply source for producing an output at said connection point; and
    blue and green subtracting means respectively provided on said blue primary color signal line and said green primary color signal line for subtracting the output of said transistors from said blue primary color signal and said green primary color signal, respectively.

13. A color television receiver according to claim 12, further comprising means for controlling an amplitude level of said output of said transistors.

14. A color television receiver comprising:
    color demodulating means supplied with a chroma signal for producing three color difference signals;
    matrix circuit means for producing red, green and blue primary color signals in negative polarity at respective output terminals along red, green and blue primary color signal lines, respectively, said matrix circuit means being supplied with a luminance signal and said three color difference signals from said color demodulating means;
    first, second and third transistors whose bases are supplied with respective ones of said three color difference signals, whose emitters are connected in common to ground, and whose collectors are connected in common to a connection point connected in turn to a power supply source for producing an output at said connection point; and
    blue and green subtracting means respectively provided on said blue primary color signal line and said green primary color signal line for subtracting the output of said transistors from said blue and green primary color signals, respectively.

15. A color television receiver according to claim 14, further comprising means for controlling an amplitude level of said output of said transistors.

* * * * *